United States Patent
O'Dell et al.

(10) Patent No.: US 9,528,007 B2
(45) Date of Patent: Dec. 27, 2016

(54) POWDER COLORING SYSTEM

(71) Applicant: Valspar Sourcing, Inc., Minneapolis, MN (US)

(72) Inventors: George William O'Dell, Lawson, MO (US); Larry B. Brandenburger, Lino Lakes, MN (US); Steven D. Johnson, Prairie Village, KS (US); Judith L. Bourdeau, Prior Lake, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 14/844,593

(22) Filed: Sep. 3, 2015

(65) Prior Publication Data

US 2016/0046814 A1 Feb. 18, 2016

Related U.S. Application Data

(62) Division of application No. 12/083,252, filed as application No. PCT/US2006/040831 on Oct. 18, 2006, now Pat. No. 9,156,996.

(60) Provisional application No. 60/729,384, filed on Oct. 21, 2005.

(51) Int. Cl.
| C04B 14/00 | (2006.01) |
| C09C 1/04  | (2006.01) |
| C09D 5/03  | (2006.01) |
| C09D 167/02 | (2006.01) |

(52) U.S. Cl.
CPC ............ C09D 5/035 (2013.01); C09D 5/03 (2013.01); C09D 167/02 (2013.01); *C08J 2467/00* (2013.01)

(58) Field of Classification Search
None
See application file for complete search history.

(56) References Cited

U.S. PATENT DOCUMENTS

| | | |
|---|---|---|
| 3,843,571 A | 10/1974 | Fitzgerald |
| 3,867,480 A | 2/1975 | Fujiyoshi et al. |
| RE28,361 E | 3/1975 | Hahn |
| 3,909,282 A | 9/1975 | Gray |
| 3,939,114 A | 2/1976 | Camelon et al. |
| 3,941,904 A | 3/1976 | Hoh et al. |
| 3,972,844 A | 8/1976 | Morosawa et al. |
| 3,980,607 A | 9/1976 | Johannes |
| 3,998,768 A | 12/1976 | Pettit, Jr. |
| 4,112,214 A | 9/1978 | Tsou |
| 4,138,511 A | 2/1979 | Rolles et al. |
| 4,169,737 A | 10/1979 | Burke, Jr. et al. |
| 4,200,566 A | 4/1980 | FitzGerald et al. |
| 4,242,253 A | 12/1980 | Yallourakis |
| 4,260,066 A | 4/1981 | Hannon et al. |
| 4,268,549 A | 5/1981 | Fink et al. |
| 4,312,795 A | 1/1982 | Taguchi et al. |
| 4,320,048 A | 3/1982 | Harmuth |
| 4,543,313 A | 9/1985 | Mahabadi et al. |
| 5,034,432 A | 7/1991 | Ueno et al. |
| 5,196,471 A | 3/1993 | Rangaswamy et al. |
| 5,319,001 A | 6/1994 | Morgan et al. |
| 5,324,787 A | 6/1994 | Pinschmidt, Jr. et al. |
| 5,458,976 A | 10/1995 | Horino et al. |
| 5,470,893 A | 11/1995 | Sinclair-Day et al. |
| 5,571,454 A | 11/1996 | Chen et al. |
| 5,837,049 A | 11/1998 | Watson et al. |
| 5,856,378 A | 1/1999 | Ring et al. |
| 5,908,877 A | 6/1999 | Ci et al. |
| 5,955,530 A | 9/1999 | Inoue et al. |
| 6,020,403 A | 2/2000 | Eck et al. |
| 6,063,855 A | 5/2000 | Pecsok et al. |
| 6,133,344 A | 10/2000 | Blatter et al. |
| 6,146,145 A | 11/2000 | Itakura et al. |
| 6,184,311 B1 | 2/2001 | O'Keeffe et al. |
| 6,200,580 B1 | 3/2001 | Horino et al. |
| 6,203,768 B1 | 3/2001 | McCormick et al. |
| 6,284,846 B1 | 9/2001 | Ambrose et al. |
| 6,287,377 B1 | 9/2001 | Binns et al. |
| 6,360,974 B1 | 3/2002 | Sacharski et al. |
| 6,488,760 B1 | 12/2002 | Binns et al. |
| 6,663,960 B1 | 12/2003 | Murakami et al. |
| 6,797,749 B1 | 9/2004 | Cordiner |
| 6,802,641 B2 | 10/2004 | Ladatto et al. |
| 7,867,555 B2 | 1/2011 | O'Dell et al. |
| 2002/0128348 A1 | 9/2002 | Palmer |
| 2003/0021983 A1 | 1/2003 | Nohr et al. |
| 2003/0181570 A1 | 9/2003 | Ladatto |
| 2003/0191230 A1 | 10/2003 | Ladatto |

(Continued)

FOREIGN PATENT DOCUMENTS

| DE | 2 549 406 | 5/1976 |
| EP | 0 250 183 | 12/1987 |

(Continued)

OTHER PUBLICATIONS

First Communication for corresponding European patent application No. 06 826 254.2, dated Mar. 24, 2009, 3 pages.
First Examiner's Report for corresponding Canadian patent application No. 2,626,393, dated Sep. 22, 2009, 4 pages.
Chinese Office Action from Chinese patent application No. 200680038649.6, dated Apr. 14, 2010, 5 pp.
Notification of Transmittal of the International Search Report and the Written Opinion of the International Searching Authority for corresponding patent application No. PCT/US2006/040831, mailed Aug. 16, 2007, 13 pages.
Reply to Written Opinion for corresponding patent application No. PCT/US2006/040831, filed Nov. 16, 2007, 32 pages.

(Continued)

*Primary Examiner* — Kaj K Olsen
*Assistant Examiner* — Ross J Christie

(57) ABSTRACT

A method for coloring powders is provided that includes mixing a base powder and non-incorporated pigments. A colored powder composition having a base powder particle and at least a partial shell of non-incorporated pigments about the base powder particle is also provided. Articles having a coating of the colored powder composition are also provided.

4 Claims, No Drawings

(56) References Cited

U.S. PATENT DOCUMENTS

| | | |
|---|---|---|
| 2004/0151940 A1 | 8/2004 | Takano et al. |
| 2005/0124756 A1 | 6/2005 | Miller et al. |
| 2005/0182155 A1 | 8/2005 | O'Dell et al. |
| 2006/0014031 A1 | 1/2006 | Ohkoshi et al. |
| 2006/0106134 A1 | 5/2006 | Ladatto et al. |

FOREIGN PATENT DOCUMENTS

| | | |
|---|---|---|
| EP | 0 312 331 | 4/1989 |
| EP | 0 372 860 | 6/1990 |
| EP | 0 372 958 | 6/1990 |
| EP | 0 389 080 | 9/1990 |
| EP | 1 323 769 | 7/2003 |
| FR | 2 190 874 | 2/1974 |
| FR | 2768151 | 3/1999 |
| GB | 1 377 780 | 12/1974 |
| GB | 1 383 602 | 2/1975 |
| GB | 1 387 791 | 3/1975 |
| GB | 1 485 388 | 9/1977 |
| GB | 1 512 495 | 6/1978 |
| GB | 2 026 506 | 2/1980 |
| GB | 2 226 824 | 7/1990 |
| JP | S47-27778 | 7/1972 |
| JP | 61-221234 | 10/1986 |
| JP | 11-060839 | 3/1999 |
| WO | WO 91/01798 | 2/1991 |
| WO | WO 99/18161 | 4/1999 |
| WO | WO 02/42384 | 5/2002 |
| WO | WO 02/094950 | 11/2002 |
| WO | WO 2004/011531 | 2/2004 |

OTHER PUBLICATIONS

Greenhalgh, "Metallic Powder Coatings", Polymers Paint and Colour Journal, p. 920, Sep. 19, 1979.

Carter, "Ten Years of Bonded Metallic Powder Coatings", Polymer Paint & Colour Journal, vol. 176, No. 4179, pp. 866-868, Nov. 12, 1986.

Bine, "Metallic Powder Coatings", Thermoset Powder Coatings, ed. J. Ward, FMJ International Publications Ltd., 161(4008), pp. 4 pp. 1989.

Diffusion in Polymers Platform: Liquid Diffusion, (2 pages). Printed from the internet on Jan. 27, 2004. http://www.diffusion-polymers.com/Liquid%20Diffusion.htm.

"How to Decide Between Anodizing, Painting and Powder Coatings", (8 pages). Printed from the internet on Mar. 23, 2004. http://www.saf.com/rightfinish.html.

Office Action from U.S. Appl. No. 10/778,895, dated Jun. 10, 2010, 9 pp.

Response to Office Action dated Jun. 10, 2010, from U.S. Appl. No. 10/778,895, filed Aug. 10, 2010, 11 pp.

Machine Translation of abstract of EP 1323769 A2, Etzrodt et al., Jul. 2003, 1 pg.

Notice of Allowance for U.S. Appl. No. 10/778,895, mailed Sep. 1, 2009, 9 pp.

POWDER COLORING SYSTEM

CROSS-REFERENCE TO RELATED APPLCATIONS

This application is a divisional of U.S. application Ser. No. 12/083,252 filed on Apr. 8, 2008, which is a U.S. National Stage filing under 35 USC 371 of International Application No. PCT/US2006/040831, filed Oct. 18, 2006, which claims priority to U.S. Provisional Application No. 60/729,384, filed Oct. 21, 2005, the disclosures of all of which are incorporated herein by reference.

TECHNICAL FIELD

This invention relates to powder coating compositions and methods for their manufacture and use.

BACKGROUND

Powder coatings are an alternative to traditional liquid based coatings and paints. Liquid based systems are fairly easy to tint and color to produce a desired color. However, this has not been generally true of powder-based systems due to the manufacturing process as well as the application process for powders.

Powder coatings are generally manufactured in a multi-step process. Various ingredients, which may include resins, curing agents, pigments, additives, and fillers, are dry-blended to form a premix. This premix is then fed into an extruder, which uses a combination of heat, pressure, and shear to melt and thoroughly mix the ingredients. As the ingredients mix together in melted form during the extrusion process, various colors of pigments can be mixed together to produce a uniform color. The extrudate is cooled and then ground into a powder. Depending on the desired coating end use, the grinding conditions are typically adjusted to achieve a powder median particle size of about 25-150 µm.

The final powder may then be applied to an article by various means including the use of fluid beds and spray applicators. Most commonly, an electrostatic spraying process is used, wherein the particles are electrostatically charged and sprayed onto an article that has been grounded so that the powder particles are attracted to and cling to the article. After coating, the article is heated. This heating step causes the powder particles to melt and flow together to coat the article.

Optionally, continued or additional heating may be used to cure the coating. Other alternatives such as UV curing of the coating have been discovered and may be used.

A characteristic and limitation of powder coatings that is different from liquid paints is that when powder coatings of two different colors are blended together, the resultant finish typically has a speckled appearance rather than being uniform in color. For example, if a white powder coating is mixed with, or contaminated with, a black powder coating and then applied, the final coating will have a black and white speckled appearance, instead of having a uniform gray color finish.

This characteristic of powder coatings has important implications in the economics of powder coatings manufacture, as each powder composition must be separated from other powder compositions. However, it is difficult to quickly and inexpensively change from one powder coating composition color to another. Changing compositions requires complete separation of product from one batch of colored powder to the next at all stages of manufacturing. At the extruder, this typically requires a complete purge of the equipment, and then feeding the next composition until it stabilizes. This takes time and results in waste product. At the grinder, the entire grinding system must be cleaned. This typically requires major disassembly and cleaning of all grinding equipment and associated ductwork, and then reassembly, which is a time and labor intensive endeavor. Failure to fully clean the equipment will result in the second powder color composition having specks of the first color composition in it.

The cleaning process for switching from production of one color to another is particularly onerous in the production of small batches of special colors. For small batches, it is not uncommon for the cleaning process to consume more time and labor than was required to extrude and grind the batch.

A related problem occurs when a customer requests a custom color powder coating. If the color initially produced does not match the requested color, then it must be re-fed into the extruder with additional pigment or material. This requires the whole process, including clean up, to be repeated. Alternatively, the batch may be discarded and an entirely new batch run to obtain the proper color match.

For all of these reasons, it is difficult, time consuming, and expensive to produce small amounts of any particular powder coating color. It is greatly preferred to produce large amounts of the same color, with minimal changeovers. However, due to the overall advantages of powder coatings, there is a growing acceptance of powder coatings. This is turn has lead to a greater demand for a wider variety of colors for an increasing array of applications.

SUMMARY

In one aspect, the invention allows the rapid and cost-effective creation of an almost endless variety of powder coating compositions. This is accomplished by enabling the mixing of color onto a powder. A further benefit is that this allows different process steps to be run most efficiently and effectively. Another benefit is that the number of intermediate materials can be minimized while maximizing the array of finished products available. This provides for an efficient manufacturing process that minimizes costs associated with inventory and cleanup.

In another aspect, the present disclosure is directed to a method including:

providing at least one base powder having a median particle size of at least 25 µm;

providing at least one non-incorporated white pigment;

providing at least one non-incorporated coloring pigment; and mixing the base powder, the non-incorporated white pigment and the non-incorporated coloring pigment to form a colored mixture, wherein at least a majority of the non-incorporated white pigments and the coloring pigments on the surface of the base powder are loosely associated with the base powder and are capable of being re-distributed to another base powder upon further mixing, and wherein the colored mixture includes at least 1 wt. % non-incorporated white pigment, based on the total weight of the colored mixture. In a preferred embodiment, the mixture yields a free flowing colored powder.

In yet another aspect, the present disclosure is directed to a method, including:

providing at least one base powder having a median particle size of at least 25 µm, wherein the base powder is a thermoset material;

providing at least one non-incorporated white pigment;

providing at least one non-incorporated coloring pigment; and mixing the base powder, the non-incorporated white pigment and the non-incorporated coloring pigment form a colored mixture, wherein the colored mixture includes at least 1 wt. % non-incorporated white pigment, based on the total weight of the colored mixture. In a preferred embodiment, the mixture yields a free flowing colored powder.

In another aspect, the present disclosure is directed to a composition, including:

a base powder particle having a median particle size of at least 25 μm; and at least a partial shell about the base powder particle, wherein the shell includes at least 4,500 non-incorporated white pigment particles and a plurality of non-incorporated colored pigment particles.

In yet another aspect, an article is provided that has a coating of the present invention deposited thereon.

The details of one or more embodiments and aspects of the invention are set forth below. Other features, objects, and advantages of the invention will be apparent from the description and from the claims.

DETAILED DESCRIPTION

In one embodiment, the present invention provides a method which includes the steps of : providing at least one base powder containing up to about 25 wt. % incorporated white pigment; providing at least one non-incorporated white pigment; providing at least one non-incorporated coloring pigment; and mixing the base powder, the white pigment and the coloring pigment to thereby distribute the non-incorporated pigments and the base powder to form a colored mixture, wherein the colored mixture comprises at least about 1 wt. % non-incorporated white pigment. In a preferred embodiment, the mixture yields a free flowing colored powder.

Suitable base powders for use in the present invention preferably include at least one polymeric binder. They may also optionally include one or more incorporated pigments, opacifying agents or other additives. These ingredients are combined and mixed prior to being fed into an extruder.

Suitable polymeric binders generally include a film forming resin and optionally a curing agent for the resin. The binder may be selected from any resin or combination of resins that provides the desired film properties. Suitable examples of polymeric binders include thermoset and/or thermoplastic materials, and can be made with epoxy, polyester, polyurethane, polyamide, acrylic, polyvinylchloride, nylon, fluoropolymer, silicone, other resins, or combinations thereof. Thermoset materials are preferred for use as polymeric binders in powder coating applications, and epoxies, polyesters and acrylics are particularly preferred. If desired, elastomeric resins may be used for certain applications.

Examples of preferred binders include the following: carboxyl-functional polyester resins cured with epoxide-functional compounds (e.g., triglycidyl-isocyanurate), carboxyl-functional polyester resins cured with polymeric epoxy resins, carboxyl-functional polyester resins cured with hydroxyalkyl amides, hydroxyl-functional polyester resins cured with blocked isocyanates or uretdiones, epoxy resins cured with amines (e.g., dicyandiamide), epoxy resins cured with phenolic-functional resins, epoxy resins cured with carboxyl-functional curatives, carboxyl-functional acrylic resins cured with polymeric epoxy resins, hydroxyl-functional acrylic resins cured with blocked isocyanates or uretdiones, unsaturated resins cured through free radical reactions, and silicone resins used either as the sole binder or in combination with organic resins. The optional curing reaction may be induced thermally, or by exposure to radiation (e.g., UV, UV-Vis, Visible light, IR, near IR, and E-beam).

The final base powder may be clear, translucent or opaque. For most products and colors a translucent base powder is preferred. However, clear base powders may be useful for dark colors.

To make a translucent base powder it is preferred to incorporate a white pigment (e.g., titanium dioxide (TiO2)) into the powder. As discussed below, this may be conveniently accomplished using an extrusion process. The amount of white pigment that is incorporated into the base powder is generally less than that required to make a finished colored powder using the conventional extrusion method. By way of comparison, typical powder paints made using the conventional extrusion method contain between 20 and 35 wt. % white pigment (e.g., TiO2) dispersed within the powder. The base powders of the present invention, in contrast, generally contain less than 25 wt. %, more preferably less than 20 wt. %, and most preferably less than 15 wt. % white pigment (e.g., TiO2) within the base powder. The base powders of the present invention may be clear without any incorporated white pigment (i.e., a clear base powder) but preferably are translucent and incorporate at least 3 wt. %, more preferably at least 5 wt. %, and most preferably at least 7 wt.% white pigment (e.g., TiO2) within the base powder.

As discussed below, additional white pigment (e.g., TiO2) is mixed with the base powder, along with one or more coloring pigments. Because these pigments are not "incorporated" into the base powder, e.g., via an extrusion step, but lie on the surface when the powder is in its free flowing state (i.e., before the powder is converted into a film), they are referred to herein as "non-incorporated." It is recognized that some of the "non-incorporated" pigment may during a subsequent film-forming step become an intimate part of the composition.

It has been found that the total amount of white pigment (i.e., the sum of the incorporated white pigment within the base powder and the non-incorporate portion which is distributed on the surface) is approximately the same amount as is typically used when solely utilizing the extrusion process to make a finished powder.

The base powder may optionally be colored with dyes or pigments, though this is not preferred in situations where the base powder is to be used to make a wide variety of final colors. Colored base powders contain a sufficient quantity of pigments or dyes to induce some degree of color (and also some opacity), and are useful for colors in which a substantial portion of the required pigmentation is already included in the base powder.

The base powder may optionally include other additives. These other additives can improve the application of the powder coating, the melting and/or curing of that coating, or the performance or appearance of the final coating. Examples of optional additives which may be useful in the base powder include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, thixotropes, and edge coverage additives.

The polymeric binder is dry mixed together with any optional additives, and then is typically fed through an extruder. The resulting extrudate is then ground to form a powder. Other methods may also be used. For example, one alternative method uses a binder that is soluble in liquid carbon dioxide. In that method, the dry ingredients are mixed into the liquid carbon dioxide and then sprayed to form the base powder particles. If desired, powders may be classified or sieved to achieve a desired particle size and/or distribution of particle sizes.

The resulting powder is at a size that can effectively be used by the application process. Practically, particles less than 10 μm in size are very difficult to apply effectively using conventional electrostatic spraying methods. Consequently, powders having median particle size less than about 25 μm are difficult to electrostatically spray because those powders typically have a large fraction of small particles. Preferably the grinding is adjusted (or sieving or classifying is performed) to achieve a powder median particle size of about 25 to 150 μm, more preferably 30 to 70 μm, most preferably 30 to 50 μm.

The resulting powder preferably has a melt viscosity of at least 90 Pa·s, more preferably at least 95 Pa·s, and most preferably at least 100 Pa·s, when tested using an ICI cone and plate viscometer set at 160° C. and using a shear rate of 3,600 s-1.

The present invention may also be used to color, or adjust the color of, powders obtained from various suppliers including Valspar, Akzo Nobel, Rohm & Haas, Sherwin Williams and H.B. Fuller.

The base powder optionally contains an incorporated white pigment within it, and compositions of the present invention contain a non-incorporated white pigment. Suitable white pigments for use as either the incorporated or the non-incorporated white pigments in the present invention include any white (or near white) pigment that is capable of contributing opacity (i.e., hiding) to the finished composition. Examples of suitable incorporated or non-incorporated white pigments include titanium dioxide (titanic anhydride, titanic acid anhydride, titanic oxide, titanium white, titania), HITOX (a commercially available impure TiO2 material), powders of zinc sulfide and barium sulphate (e.g., LITHOPONE), aluminum phosphate nanoparticles (e.g., BiPHOR, from Bunge Fertilizantes S.A., Sao Paulo, Brazil), zinc oxide, or other white inorganic pigments. Titanium dioxide is produced, in general by a chloride process by which mineral rutile or refined ore is reacted with gaseous chlorine at about 1200° C. in the presence of coke to form liquid titanium tetrachloride. After distillation, the distillate is oxidized in the vapor phase to produce crude pigmentary titanium dioxide. After treatment, organic and inorganic components may be added to achieve certain properties.

The median white pigment particle size is suitably about 0.01 to 4.0 μm, and preferably about 0.04 to 1.0 μm. Titanium dioxide pigments generally have a median particle size of 0.1 to 0.5 μm, more preferably 0.15 to 0.3 μm.

In addition to any incorporated white pigment within the base powder, a sufficient amount of non-incorporated white pigment is mixed with the base powder, to thereby distribute the non-incorporated pigment (e.g., on the surface of the base powder). It has been found that the presence of non-incorporated white pigment in the composition can greatly lessen (or functionally eliminate) the speckled appearance of the final film formed from the composition. Preferably, at least 1 wt. %, more preferably at least 2 wt. %, most preferably at least 3 wt. %, and optimally at least 4 wt. % non-incorporated white pigment is mixed with the base powder, based on the total dry weight of the powder mixture. While large amounts of non-incorporated white pigment may be mixed with the base powder, it should be appreciated that too much can adversely impact properties such as flow or coalescence. Consequently, preferably the mixture contains less than about 10 wt. % non-incorporated white pigment, more preferably less than 8 wt. %, based on the total dry weight of the powder mixture.

Various organic or inorganic coloring pigments may be used in the present invention. In dry form, most pigments are highly agglomerated, consisting of clusters of primary particles that are bound together by physical forces. Suitable coloring pigments include carbon black, red iron oxide, yellow iron oxide, raw umber, phthalocyanine blue, phthalocyanine green, napthol red, toluidine red, various organic yellows, carbazole violet, and quinacridones. If desired, processed coloring pigments, such as pigments that have been coated with polymeric materials may be used. Suitable such pigments include SURPASS products from Sun Chemical.

The median pigment particle size is suitably about 0.01 to 4.0 μm, and preferably about 0.04 to 1.0 μm. Organic pigments typically have a median particle size of less than 0.3 μm. Iron oxide pigments typically have a median particle size of 0.2 to 0.6 μm. Carbon black has a median particle size around 0.07 μm, while phthalocyanine blue typically has a median particle size around 0.05 μm.

The amount of non-incorporated coloring pigment mixed onto the base powder will depend on the desired color of the final product. The amounts of non-incorporated coloring pigments used in several exemplary colors are illustrated in the following examples. In general, it has been found that less coloring pigment is needed to produce a particular color using the method of the present invention than is needed when using conventional extrusion methods (i.e., when all the pigments are contained within the powder).

Optionally, other additives may be used in the present invention. As discussed above, these optional additives may be added prior to extrusion and be part of the base powder, or may be added post extrusion. Suitable additives for addition after extrusion include materials that would not perform well if they were added prior to extrusion; materials that would cause additional wear on the extrusion equipment, or other additives. Additionally, optional additives include materials which are feasible to add during the extrusion process, but which are found desirable to add later. The additives may be added alone or in combination with other additives to provide a desired effect on the powder finish or the powder composition. These other additives can improve the application of the powder, the melting and/or curing, or the final performance or appearance. Examples of optional additives which may be useful include: cure catalysts, antioxidants, color stabilizers, slip and mar additives, UV absorbers, hindered amine light stabilizers, photoinitiators, conductivity additives, tribocharging additives, anti-corrosion additives, fillers, texture agents, degassing additives, flow control agents, thixotropes, and edge coverage additives.

Other preferred additives include performance additives such as rubberizers, friction reducers, and microcapsules. Additionally, the additive could be an abrasive, a catalyst, heat sensitive, or one that helps create a porous final coating. Also, additives to improve wetting of the base powder may be added.

Mixing can be carried out by any available mechanical mixer or by manual mixing. Some examples of possible mixers include Henschel mixers (available, for example, from Henschel Mixing Technology, Green Bay, Wisc.), Mixaco mixers (available from, for example, Triad Sales, Greer, SC or Dr. Herfeld GmbH, Neuenrade, Germany), Marion mixers (available from, for example, Marion Mixers, Inc., 3575 3rd Avenue, Marion, Iowa), invertible mixers, Littleford mixers (from Littleford Day, Inc.), horizontal shaft mixers and ball mills. Preferred mixers would include those that are most easily cleaned.

The mixing step is preferably performed at a temperature below the glass transition temperature of the base powder. More preferably, the mixing step is carried out at a temperature less than 40° C., and even more preferably at less than 30° C., and under relatively gentle conditions. Typically, the components are stirred together in a suitable mixer for 1 to 60 minutes, more preferably 15 to 30 minutes, to provide the requisite mixing. Ideally, regardless of the particular mixing device utilized, the mixing time and rpm should be chosen such that there is only minimal change in particle size. The objective of the mixing step is to uniformly distribute the base powder particles with the white pigment and coloring pigment, not to cause significant particle size changes. The desired end product is preferably a free-flowing powder.

If desired, the non-incorporated white pigment and the non-incorporated coloring pigment may be fused to the base powder or alternatively it may be weakly associated with the base powder. It is preferred that the non-incorporated pigments not be fused to the base powder. This enables color correction to be made by, for example, adding additional base powder and "re-distributing" the non-incorporated pigments across all the base powder present in the mixture. In addition, by not fusing the non-incorporated pigments to the base powder, unused colored mixtures can be easily blended to form new colors, without the speckled appearance that a blend of fused colored particles might provide. In preferred embodiments of the present invention, at least a majority of the non-incorporated white and coloring pigments are loosely associated with the base powder and are capable of being re-distributed to another base powder upon further mixing. In more preferred embodiments of the present invention, at least 75% (and most preferably at least 90%) of the non-incorporated white and coloring pigments are loosely associated with the base powder and are capable of being re-distributed to another base powder upon further mixing.

One illustrative method of the present invention is to select one or more base powders, one or more non-incorporated white pigments, and one or more non-incorporated coloring pigments. The non-incorporated pigments are added to the base powder(s) by pouring, or any manual, mechanical or automatic means. Other optional additives may be added. This can be poured or added by any manual, mechanical or automatic means. These optional additives can be combined with the base powder before or after addition of the pigments, or can be premixed with the pigment prior to addition of the pigment. The base powder plus any additions are mixed or allowed to become uniformly distributed. In certain embodiments, the mixing can occur at the same time as any additions are made, which may obviate the need for additional or separate mixing and will provide the required level of uniformity to the mixture.

While not wishing to be bound by any theory, presently available evidence indicates that once the non-incorporated pigments are added to the base powder, the pigments form a coating layer (in one embodiment a preferably weakly associated layer) on the surface of the base powder particles. Presently available evidence indicates that the number of non-incorporated pigment particles typically associated with each core base particle varies depending on the size of the base particle, size of the pigment/dye particle, and the amount of pigment/dye used. This can be seen on the following table, which uses a base powder particle size of 32 μm in diameter for calculations.

| Pigment | Average pigment particle diameter, μm | Exemplary pigment usage level (wt % of powder coating) | Relative number of pigment particles per base particle |
|---|---|---|---|
| Titanium Dioxide* | 0.3 | 3.5% | 15,700 |
| Red Iron Oxide | 0.2 | 2.1% | 26,000 |
| Yellow Iron Oxide | 0.6 | 2.7% | 1,520 |
| Phthalocyanine Blue | 0.05 | 0.8% | 2,110,000 |
| Carbon Black | 0.07 | 0.1% | 80,100 |
| Organic Red | 0.3 | 1.2% | 14,900 |

*As previously mentioned, additional $TiO_2$ may be incorporated into the base powder. This calculation only accounts for the non-incorporated $TiO_2$, not any $TiO_2$ that may be within the base powder.

In one embodiment, the present invention provides a powder coating composition that comprises a plurality of powder particles, wherein the powder particles have at least a partial shell of non-incorporated white and coloring pigment particles. Preferred such compositions comprise a base powder particle having a median particle size of 25 to 150 μm, more preferably 30 to 70 μm, most preferably 30 to 50 μm. Preferred such compositions comprise at least 4,500 non-incorporated TiO2 particles, more preferably at least 9,000 non-incorporated TiO2 particles associated with or on the surface thereof.

In one embodiment a colored mixture is prepared by mixing at least one base powder, at least one non-incorporated white pigment, and at least one non-incorporated coloring pigment, to thereby distribute the non-incorporated pigments and the base powder. A sample of the colored mixture can then be assessed (e.g., applied to a substrate and compared to a target color or target color value) to ensure that the desired color has been achieved. If the color is not within specification, then additional quantities of base powder, non-incorporated white pigment, and/or non-incorporated coloring pigment may be added to the initial colored mixture and mixed. The second mixing step preferably redistributes the non-incorporated pigments and the base powders to form an adjusted colored mixture having the desired color.

In another embodiment, traditionally prepared powder paints (e.g., a powder paint formed using the extrusion method) may be tinted using the method of the present invention. Namely, the powder paint is tinted to a different color (or different shade) by mixing the powder paint with at least one non-incorporated white pigment and at least one non-incorporated coloring pigment, to thereby distribute the non-incorporated pigments and the powder paint and change the color of the powder paint.

The completed powder of the present invention may be applied to a substrate using any conventional method, including spraying, electrostatic spraying, fluidized beds and the like. Following powder application, the substrate is heated to a temperature sufficient to cause the powder particles to melt and flow. Various heating sources may be used, including convection heating, infrared heating, near-infrared heating, induction heating, or a combination thereof. Optionally, the powder may be applied to a preheated substrate.

Then the coating is optionally cured, and such curing may occur via continued heating, subsequent heating, or residual heat in the substrate. In another embodiment of the invention, if a radiation curable powder coating base is selected, the powder can be melted by a relatively short or low temperature heating cycle, and then may be exposed to radiation to initiate the curing process. One example of this embodiment is a UV-curable powder. Other examples of radiation curing include using UV-Vis, Visible light, near-IR, IR and E-beam.

Preferably, the coated substrate is uniformly colored and has the desirable physical and mechanical properties. By "uniformly colored" is meant that a coated substrate appears unspeckled (or only minimally speckled) to the naked eye at a distance of approximately 0.3 meters. More preferably, the coated substrate is uniformly colored when examined at this distance under 2× magnification. Thickness of the final film coating depends upon the desired application of the substrate and the additives selected. Typically, the final film coating will have a thickness of 25 to 200 microns.

Another feature of the current invention is that less coloring pigment may be needed to produce the same color in the final film coating. This may vary depending on the pigment used, but typically about 25% less coloring pigment is required than if the coloring pigment is mixed thoroughly with the film forming resin, such as occurs in the extruder. Additionally, in the current invention, some white pigment and some coloring pigment is at the surface of the particles, rather than being throughout the powder particles. This allows the same amount of pigment at the surface of the final film coating with less pigment being added. Illustratively, when one makes a very thin cut through the final film coating and examines the exposed cut under a microscope, the pigment appears to be distributed at the interface of the coalesced base powder.

It was a surprising finding that for powders of the present invention that have non-incorporated coloring pigment, there should also be at least a portion of the white pigment that is non-incorporated.

While not intending to be bound by theory, Applicants believe that this finding can be explained when one considers the three-dimensional geometry of the coated powders and the two-dimensional appearance of films of these particles.

Notably, assuming that the non-incorporated white pigment and coloring pigments are fairly uniformly distributed on the surface of the base powder, the pigments will not appear to be uniformly distributed. For purposes of this illustration, the base powder may be roughly approximated as a sphere. As such, the pigments form a shell or partial shell on the surface of the powder. When an observer views a film of these powders, the spheres will have coalesced and appear in projection as a hexagon. The pigment that is lying on top of the center of the hexagon will appear less intense (as it is only one layer thick) than pigment that is on the "edges" of the hexagon. This is because the "edge" of the hexagon is actually a view down the side of the three-dimensional particle and the eye sees a thicker cross-section of pigment.

Applicants have surprisingly found that when no non-incorporated white pigment is mixed with the base powder, the non-incorporated coloring pigments provide a "speckled" appearance. When a sufficient amount of the non-incorporated white pigment is mixed with the base powder and coloring pigments the final film appearance is more uniform. This uniformity cannot be achieved simply by incorporating the white pigment in the base powder. Doing so will perhaps make the overall film more opaque, but the appearance of the color will still be speckled as the pigment will still appear concentrated at the interface of adjoining powders.

The following examples are offered to aid in understanding of the present invention and are not to be construed as limiting the scope thereof. Unless otherwise indicated, all parts and percentages are by weight.

EXAMPLES

Several materials cited in the following examples were evaluated by tests common in the industry. These test results were obtained from manufacturer literature. Acid value measures milligrams of potassium hydroxide reacted per gram of resin.

The following are raw material suppliers for various ingredients listed in the examples below. Crylcoat 630 and Crylcoat 440 are products of Cytec Surface Specialties. PF-67 is a product of Estron. R-960 and R-900 are products of DuPont. Raven 450 is a product of Columbian Carbon. YZ 1688 and R 2899 are products of Elementis. Crematt 8600 is a product of Bayer.

The following "Uniformity Rating Scale" is used in the Examples.
1 Very speckled; speckles easily visible at a distance of 0.6 m.
2 Very speckled; speckles visible at a distance of 0.6 m.
3 Very speckled; speckles easily visible at a distance of 0.3 m.
4 Moderately speckled; speckles visible at a distance of 0.3 m.
5 Slightly speckled; speckles visible at a distance of 0.3 m.
6 Very slightly speckled; speckles visible at a distance of 0.3 m.
7 Very slightly speckled; speckles visible only upon careful examination at a distance of 0.3 m.
8 Uniformly colored; no speckles visible to the unaided eye, easily visible speckles with 2× magnification.
9 Uniformly colored; no speckles visible to the unaided eye, slightly visible speckles with 2× magnification.
10 Uniformly colored; no speckles visible to the unaided eye or with 2× magnification.

Under the above rating scale, it is believed that uniformity ratings of 6 or above should be commercially acceptable for many powder coatings applications, and that ratings of 8 or above should be acceptable for almost all customers and end-uses.

Example 1

Preparation of White Polyester Powder Coating Base

TABLE 1

| Ingredient | Parts by weight |
| --- | --- |
| Polyester Resin (Crylcoat 630, Acid value 30-36) | 823.0 |
| Polyester Resin (Crylcoat 440, Acid value 32-38) | 823.0 |
| Triglycidylisocyanurate Curing Agent | 124.0 |
| Acrylic Flow Control Agent (PF-67) | 20.0 |
| Benzoin | 10.0 |
| Titanium Dioxide (R-960) | 200.0 |
| Total | 2000.0 |

The above ingredients were dry blended, then extruded. The extrudate was cooled, combined with 0.2% of Degussa Aluminum Oxide C dry flow agent, and then ground on an air classifying mill to a median particle size of 33.0 microns, as determined by a Malvern Mastersizer 2000 laser particle size analyzer. The resulting white polyester powder coating base was used for subsequent blending studies as described below.

Example 2

Preparation of Gray Polyester Powder Coatings

TABLE 2

| Ingredient | 2A (parts by weight) | 2B (parts by weight) |
| --- | --- | --- |
| White polyester powder coating base (Example 1) | 1200.0 | 1200.0 |
| Titanium Dioxide (R-960) | — | 90.0 |
| Carbon Black (Raven 450) | 3.0 | 3.0 |

The ingredients shown in Table 2 were mixed in a laboratory Reos Mixer, which consists of a vertical shaft driving an agitator blade suspended in the mixing chamber, and revolving at a speed of 1725 rpm. The mixing time used for both samples was 8 minutes. The resulting products were both free flowing powders, which did not visually appear to contain significant quantities of agglomerates or oversize particles. Both samples were successfully electrostatic sprayed without sieving, then baked for 20 minutes at 190° C. The cured film from sample 2A showed a non-uniform or speckled appearance with the naked eye, while the film from sample 2B was much more uniform, with only a very slight trace of speckling that could be discerned with the unaided eye. Using the uniformity rating scale above, sample 2A was rated a 1, and sample 2B was rated a 7. In addition, the film from sample 2A produced a noticeable edge framing effect, with the edges of the coated panel being noticeably darker than the center of the panel. Sample 2B produced no noticeable edge framing effect.

Example 3

Preparation of Tan Polyester Powder Coating

TABLE 3A

| Ingredient | Parts by weight |
| --- | --- |
| White Polyester Powder Coating Base (Example 1) | 11804 |
| Titanium Dioxide (R-960) | 1132 |
| Yellow Iron Oxide (YZ 1688) | 41.5 |
| Red Iron Oxide (R2899) | 19.8 |
| Carbon Black (Raven 450) | 5.8 |
| Total | 13003.1 |

The ingredients listed in Table 3A were combined in a Littleford mixer Model FM-50D, equipped with a cooling jacket. The contents were mixed using both plow agitator and chopper blade at a product temperature of 27° C., for a mixing time of 20 minutes. The product was discharged from the mixer and sieved through a 94T-mesh screen.

Particle size analysis of the final product showed it to have a median particle size of 33.0 microns. Further comparison of the particle size distribution data from this sample versus the starting material white base from Example 1 showed that although the median particle size of the two samples were identical to within the nearest 0.1 micron, the sample from example 3 showed traces of a bi-modal distribution, with the smaller peak centered at about 0.8 microns and distributed between about 0.2 microns and 2.2 microns. The overall distribution showed approximately 3.5% between 0.2 micron and 2.2 microns. The starting material, white base from example 1, on the other hand, showed no evidence of bi-modal distribution, and had less than 1.0% below 2.2 microns. The top-sizes of both samples were very similar, showing traces at 105 microns, but nothing above 120 microns.

After spraying a sample of Example 3 and curing for 20 minutes at 190° C., the resulting cured film gave gloss readings of 85 (60 degree geometry) and 66 (20 degree geometry). Smoothness of the cured film was rated as being similar to the color standard that had been previously produced from powders made by the conventional extrusion process. The color uniformity of the cured film was rated as being totally uniform to the naked eye, and only traces of speckles were visible when evaluated with the aid of a 2× magnifier. Using the uniformity rating scale above, sample 3A was rated a 9.

For reference and comparison purposes, the color pigment composition used in Table 3A is shown in Table 3B below (given in weight-%, based on both pigment and on total formula), along with the color pigment composition used to commercially produce this same color using the conventional process of extruding all ingredients together (including colored pigments), followed by grinding to a finished powder.

TABLE 3B

| Ingredient | Conventional Process | | Invention | |
| --- | --- | --- | --- | --- |
|  | (on pigment) | (on total) | (on pigment) | (on total) |
| Titanium Dioxide (Incorporated) | 93.37 | 15.9 | 49.56 | 9.06 |
| Titanium Dioxide (Non-Incorporated) | 0 | 0 | 47.62 | 8.71 |
| Yellow Iron Oxide | 4.58 | 0.8 | 1.74 | 0.32 |
| Red Iron Oxide | 1.69 | 0.3 | 0.83 | 0.15 |
| Carbon Black | 0.36 | 0.1 | 0.24 | 0.04 |
| Total | 100 | 17.1 | 99.99 | 18.28 |

Example 4

Preparation of Buff Yellow Polyester Powder Coating

TABLE 4A

| Ingredient | Parts by weight |
| --- | --- |
| White Polyester Powder Coating Base (Example 1) | 14301 |
| Titanium Dioxide (R-960) | 1742.1 |
| Yellow Iron Oxide (YZ 1688) | 196.5 |
| Red Iron Oxide (R2899) | 9.3 |
| Carbon Black (Raven 450) | 2.6 |
| Total | 16251.5 |

The ingredients listed in Table 4A were mixed in a Littleford FM-50D, using the plows and chopper blade for 20 minutes, at a jacket temperature of 21-22° C., and a product temperature of 21-23° C. The product was discharged and sieved through a 94T-mesh screen. The median particle size was found to be 31.4 microns, and a bi-modal distribution was evident, with 4.5% found between 0.2 microns and 2.2 microns. The top-size was 105 microns. A sample was electrostatic sprayed and baked for 20 minutes at 190° C. Gloss readings for the cured film were 86/63 (60 degree/20 degree geometry). Visual comparison of the cured film versus the same color produced by conventional extrusion and milling techniques indicated that the two samples were comparable in smoothness. Color uniformity was rated as totally uniform to the naked eye, and only slight traces of speckles were visible under 2× magnification. The cured film was rated 9 according to the uniformity rating scale above.

Table 4B shows the pigment composition used to prepare this example, expressed as percent by weight on pigment and on total formula, versus the commercial formula used to prepare the same color by the conventional extrusion process.

TABLE 4B

| Ingredient | Conventional Process | | Invention | |
| --- | --- | --- | --- | --- |
| | (on pigment) | (on total) | (on pigment) | (on total) |
| Titanium Dioxide (Incorporated) | 86.45 | 16.27 | 44.19 | 8.78 |
| Titanium Dioxide (Non-Incorporated) | 0 | 0 | 49.36 | 9.81 |
| Yellow Iron Oxide | 13.01 | 2.45 | 6.08 | 1.21 |
| Red Iron Oxide | 0.42 | 0.08 | 0.29 | 0.06 |
| Carbon Black | 0.12 | 0.02 | 0.08 | 0.02 |
| Total | 100 | 18.82 | 99.99 | 19.88 |

Example 5

Preparation of Dark Tan Polyester Powder Coating

TABLE 5A

| Ingredient | Parts by weight |
| --- | --- |
| White Polyester Powder Coating Base (Example 1) | 16690 |
| Titanium Dioxide (R-960) | 989.4 |
| Yellow Iron Oxide (YZ 1688) | 90.8 |
| Red Iron Oxide (R2899) | 4.5 |
| Carbon Black (Raven 450) | 12.6 |
| Total | 17787.3 |

The ingredients listed in Table 5A were mixed in a Littleford FM-50D for 20 minutes, with plows and chopper mixing. A jacket temperature of 21° C. was maintained, and the product temperature was 23° C. during the mixing cycle. The product was discharged and sieved through a 105-T screen. The median particle size of the product was found to be 33.4 microns, with a bi-modal distribution evident, and 2.4% found between 0.3 and 2.2 microns. A sample was sprayed and cured for 20 minutes at 190° C. The cured film gave gloss readings of 89 (60 degree geometry) and 63 (20 degree geometry). The color appeared visually uniform to the unaided eye. Under 2× magnification, slight traces of speckles and a very slight degree of darkening at the edges of the panel were visible. The uniformity rating using the previously described scale was 7.

Table 5B shows the pigment composition used to prepare this example, expressed as percent by weight on pigment and on total formula, versus the commercial formula used to prepare the same color by the conventional extrusion process.

TABLE 5B

| Ingredient | Conventional Process | | Invention | |
| --- | --- | --- | --- | --- |
| | (on pigment) | (on total) | (on pigment) | (on total) |
| Titanium Dioxide (Incorporated) | 90.69 | 15.38 | 60.29 | 9.36 |
| Titanium Dioxide (Non-Incorporated) | 0 | 0 | 35.81 | 5.56 |
| Yellow Iron Oxide | 8.36 | 1.42 | 3.29 | 0.51 |
| Red Iron Oxide | 0.29 | 0.05 | 0.16 | 0.03 |
| Carbon Black | 0.66 | 0.11 | 0.46 | 0.07 |
| Total | 100 | 16.96 | 100.01 | 15.53 |

Example 6

Semi-Gloss White Hybrid Powder Coating Base

TABLE 6

| Ingredient | Parts by weight |
| --- | --- |
| Polyester Resin (Acid number 35) | 1082 |
| Solid Epoxy Resin | 648.3 |
| Matting agent (Crematt 8600) | 39.6 |
| Titanium Dioxide (R-960) | 200 |
| Acrylic flow control agent (PF-67) | 20 |
| Benzoin | 10 |
| Total | 1999.9 |

The ingredients of Table 6 were dry blended, then extruded. The extrudate was cooled, combined with 0.2% of Degussa Aluminum Oxide C dry flow agent, and then ground on an air classifier mill to a median particle size of 33.9 microns. The sample showed less than 0.2% below 2.2 microns, and a top-size of 120 microns. The resulting semi-gloss white hybrid powder coating base was used in further blending studies as described below.

Example 7

Re-Distribution of Non-Incorporated Pigment

TABLE 7A

| Ingredient | Parts by weight |
| --- | --- |
| Semi-gloss White Hybrid Powder Coating Base (Example 6) | 9080 |
| Titanium Dioxide (R-900) | 700 |

TABLE 7A-continued

| Ingredient | Parts by weight |
|---|---|
| Yellow Iron Oxide (YZ 1688) | 20 |
| Red Iron Oxide (R2899) | 15 |
| Carbon Black (Raven 450) | 40 |
| Total | 9855 |

The ingredients listed in Table 7A were charged to a Littleford FM-50D. The contents were mixed with plows and chopper for 20 minutes using a jacket temperature set-point of 21° C., and a product temperature of 25-26° C. A sample (identified as sample 7-1) was withdrawn and sprayed, yielding a uniform gray appearance.

An additional 4540 parts of white base were then added to the mixer, and the contents were mixed for five seconds using the plows only, without running the chopper. A sample (sample 7-2) was withdrawn and sprayed, producing a noticeably speckled appearance. Mixing was continued with the plows for an additional five minutes, and then another sample was withdrawn and sprayed, still producing a noticeably speckled appearance. This process was repeated, using the mixing times (with plows only, no chopper) shown in Table 7B. Finally, both plows and chopper were run for an additional mixing cycle of 20 minutes duration (Sample 7-7). The appearance ratings shown in Table 7B are the numeric average of ratings given by three independent observers, rounded to the nearest whole number.

TABLE 7B

| Sample number | Mixing time (cumulative) after White base addition | Rating |
|---|---|---|
| 7-1 | Before white base addition | 8 |
| 7-2 | 5 seconds | 2 |
| 7-3 | 5 minutes | 3 |
| 7-4 | 20 minutes | 4 |
| 7-5 | 1 hour | 5 |
| 7-6 | 2 hours | 4 |
| 7-7 | 3 hours | 6 |
| 7-8 | 3 hours + 20 minutes chopper | 6 |

Example 8 (Comparative)

Blending of Black and White Finished Powders in Absence of Non-Incorporated Pigment.

The following comparative example used the general mixing technique of Example 7, but all of the pigments were incorporated by extrusion into their respective base powders. 11350.0 parts by weight of the white polyester powder coating base described in Example 1 were charged to a Littleford FM-50D, and 2270.0 parts of a commercial black finished powder coating (Valspar product code 116B) were added. The contents were mixed for the same times and mixing conditions shown in Table 7B. Samples were withdrawn at selected intervals, sprayed, baked for 15 minutes at 190° C., and rated for visual uniformity in Table 8.

TABLE 8

| Sample number | Mixing time (cumulative) after White base addition | Rating |
|---|---|---|
| 8-1 | 5 seconds | 1 |
| 8-2 | 5 minutes | 1 |
| 8-3 | 20 minutes | 1 |
| 8-4 | 1 hour | 1 |
| 8-5 | 2 hours | 1 |
| 8-6 | 3 hours | 1 |
| 8-7 | 3 hours + 20 minutes chopper | 1 |

In contrast to the improvement in uniformity with mixing time that was observed for Example 7, cured films produced from the samples of Example 8 (Comparative) showed no discernable improvement in color uniformity with increased mixing time. All of the samples of Example 8 produced films that were very non-uniform and highly speckled. When rated by three different observers, samples 8-1 and 8-7 were rated as being equal in appearance to each other.

Example 9 (Comparative)

Blending of Black and White Powders with Non-Incorporated White Pigment.

The final product produced in Example 8 (approximately 13000 parts by weight) was re-loaded into the Littleford FM-50D, and 1050.0 parts of R-900 Titanium Dioxide was added. The contents were mixed for 20 minutes with both plows and chopper, using a jacket temperature of 21° C. The product was then discharged, and a sample was sprayed and cured 20'-190° C. The resulting cured film was highly speckled in appearance, similar to the films produced from Example 8, and was rated a 1 for uniformity according to the previously described uniformity rating scale.

Example 10

Preparation of Clear Semi-Gloss Hybrid Powder Coating Base

TABLE 10

| Ingredient | Parts by weight |
|---|---|
| Polyester Resin (Acid number 35) | 1623 |
| Solid Epoxy Resin | 972.5 |
| Matting agent (Crematt 8600) | 59.4 |
| Acrylic flow control agent (PF-67) | 30 |
| Benzoin | 15 |
| Total | 2699.9 |

The ingredients shown in Table 10 were dry blended, then extruded. The extrudate was cooled, combined with 0.2% of Degussa Aluminum Oxide C dry flow agent, and then ground on an air classifier mill to a median particle size of 34.1 microns. The resulting semi-gloss clear hybrid base was used in further blending studies as described below.

Example 11

Preparation of Semi-Gloss Dark Gray Hybrid Powder Coating

TABLE 11A

| Ingredient | Parts by weight |
| --- | --- |
| Clear Semi-gloss Hybrid Powder Coating Base (Example 10) | 11350 |
| Titanium dioxide (R-900) | 715.5 |
| Yellow Iron Oxide (YZ 1688) | 21.1 |
| Red Iron Oxide (R 2899) | 18.2 |
| Carbon Black (Raven 450) | 50.8 |
| Total | 12155.6 |

The ingredients listed in Table 11A were mixed in a Littleford model FM-50D using a jacket temperature set-point of 18° C., for 30 minutes, with both plows and chopper. During this mixing cycle, the product temperature dropped from 27° C. initial temperature to 23° C. final temperature. A sample was withdrawn and sprayed (Sample 11-1). Mixing was then continued for an additional 30 minutes, this time increasing the jacket temperature set-point to 41° C. The product temperature during this second mixing cycle was 25° C. initial, and increased gradually to a 40° C. final temperature. A sample was withdrawn and sprayed (Sample 11-2). Comparison of the two spray-outs from samples 11-1 and 11-2 indicated that the color, uniformity, and general appearance of the two were equal. Because the color of these samples did not match the desired color standard sufficiently closely, incremental additions of additional pigments and base were made, using mixing cycles of 20 to 30 minutes after each addition, at a jacket temperature set-point of 21° C., until a satisfactory color match was achieved. The final composition of the mixture after all additions is shown in Table 11B. Cured films obtained from the final product gave a 60 degree gloss reading of 62 and an appearance rating of 10. The median particle size of the final product was 35.3 microns.

TABLE 11B

| Ingredient | Parts by weight |
| --- | --- |
| Clear Semi-gloss Hybrid Powder Coating Base (Example 10) | 13620 |
| Titanium dioxide (R-900) | 1315.5 |
| Yellow Iron Oxide (YZ 1688) | 66.1 |
| Red Iron Oxide (R 2899) | 28.2 |
| Carbon Black (Raven 450) | 53.8 |
| Total | 15083.6 |

Table 11C shows the final pigment composition used to prepare this example, expressed as percent by weight on pigment and on total formula, versus the commercial formula used to prepare the same color by the conventional extrusion process.

TABLE 11C

| Ingredient | Conventional Process | | Invention | |
| --- | --- | --- | --- | --- |
| | (on pigment) | (on total) | (on pigment) | (on total) |
| Titanium Dioxide (Incorporated) | 88.82 | 6.56 | 0 | 0 |
| Titanium Dioxide (Non-Incorporated) | 0 | 0 | 89.88 | 8.72 |
| Yellow Iron Oxide | 2.61 | 0.19 | 4.52 | 0.44 |
| Red Iron Oxide | 2.25 | 0.17 | 1.93 | 0.19 |
| Carbon Black | 6.31 | 0.47 | 3.68 | 0.36 |
| Total | 99.99 | 7.39 | 100.01 | 9.71 |

Example 12

Preparation of Semi-Gloss Beige Hybrid Powder Coating

TABLE 12A

| Ingredient | Parts by weight |
| --- | --- |
| Semi-gloss White Hybrid Powder Coating Base (Example 6) | 12150 |
| Titanium dioxide (R-900) | 1416 |
| Yellow Iron Oxide (YZ 1688) | 45.9 |
| Red Iron Oxide (R 2899) | 3.4 |
| Carbon Black (Raven 450) | 2.7 |
| Total | 13618 |

The ingredients listed in Table 12A were combined in a Littleford model FM-50D mixer with both plows and chopper for 30 minutes, using a jacket set-point of 49° C. Under these mixing conditions, with an initial product temperature of 26° C., at the end of the 30 minute mixing cycle, the product temperature had reached a peak of 46° C. A sample of the resulting product was sprayed and baked for 20 minutes at 190° C. The cured film had a 60 degree gloss of 63, and was rated a 9 for uniformity. The median particle size was found to be 34.6 microns, with 2.2% found below 2.2 microns, and a top-size of 120 microns.

Table 12B shows the pigment composition used to prepare this example, expressed as percent by weight on pigment and on total formula, versus the commercial formula used to prepare the same color by the conventional extrusion process.

TABLE 12B

| Ingredient | Conventional Process | | Invention | |
| --- | --- | --- | --- | --- |
| | (on pigment) | (on total) | (on pigment) | (on total) |
| Titanium Dioxide (Incorporated) | 96.57 | 33.09 | 45.24 | 8.90 |
| Titanium Dioxide (Non-Incorporated) | 0 | 0 | 52.82 | 10.40 |
| Yellow Iron Oxide | 3.25 | 1.11 | 1.71 | 0.34 |
| Red Iron Oxide | 0.06 | 0.02 | 0.13 | 0.02 |
| Carbon Black | 0.13 | 0.04 | 0.10 | 0.02 |
| Total | 100.01 | 34.26 | 100 | 19.68 |

Example 13

Preparation of Gray Powder Coating by Ball Milling in a Disposable Container A plastic container 125 mm in diameter and 100 mm tall was filled approximately 25% full of 17 mm diameter solid glass spheres. 150 parts by weight of the white semi-gloss hybrid powder coating base described in Example 6 were added, followed by 11.5 parts by weight of R-900 titanium dioxide and 0.66 parts by weight of Raven 450 carbon black. The container was fitted with a lid, and then was rolled for 13.5 hours. A sample of the resulting powder was withdrawn, sprayed, and baked for 20 minutes at 190° C. The cured film gave a uniformity rating of 7.

What is claimed is:

1. A composition, comprising:
    a base powder particle having a median particle size of at least 25 microns; and
    a weakly associated layer on the base powder particle, wherein the weakly associated layer consists of 4,500 to 9,000 non-incorporated white pigment particles and a plurality of non-incorporated colored pigment particles.

2. The composition of claim 1, wherein the base powder comprises up to 25 wt. % incorporated white pigment, based on the total weight of the base powder.

3. An article, comprising:
    a substrate having a coating deposited thereon, wherein the coating is a coalesced powder coating that prior to coalescence comprises a base powder particle having a median particle size of at least 25 microns; and
    a weakly associated layer about the base powder particle that consists of 4,500 to 9,000 non-incorporated white pigment particles and a plurality of non-incorporated colored pigment particles.

4. The composition of claim 3, wherein the base powder particle comprises up to 25 wt % incorporated white pigment, based on the total weight of the base powder.

* * * * *